United States Patent [19]

Fett

[11] 3,916,394

[45] Oct. 28, 1975

[54] HIGH-SPEED RANDOM ACCESS MEMORY

[75] Inventor: Darrell L. Fett, Scottsdale, Ariz.

[73] Assignee: Honeywell Information Systems Inc., Phoenix, Ariz.

[22] Filed: Dec. 9, 1974

[21] Appl. No.: 530,574

[52] U.S. Cl. ........... 340/173 FF; 307/238; 307/291; 307/299 A; 340/173 R

[51] Int. Cl.[2] ..................... G11C 7/06; G11C 11/40

[58] Field of Search .................. 340/173 R, 173 FF; 307/238, 291, 299 A

[56] References Cited

UNITED STATES PATENTS 3,764,825 10/1973 Stewart ......................... 340/173 FF 3,821,719 6/1974 Taniguchi et al. ............ 340/173 FF

*Primary Examiner*—Stuart N. Hecker

*Attorney, Agent, or Firm*—Walter W. Nielsen; Edward W. Hughes

[57] ABSTRACT

A bipolar RAM has increased speed through use of nonsaturating voltages and improved read/write capabilities provided by memory cell and isolation circuit which functions as a sense amplifier. An output buffer including constant current means provides an output responsive to the signal from the memory cells taken through the isolation circuitry.

7 Claims, 7 Drawing Figures

HIGH-SPEED RANDOM ACCESS MEMORY

BACKGROUND OF THE INVENTION

This invention relates to electrical digital circuits as used in computer applications, and more particularly to addressable, random access memories (RAMs).

Various storage devices or memories are used in computer systems for program and data storage, ranging from slower speed bulk storage devices such as magnetic tapes and discs to the main memory resident in the central processing unit where speed is placed at a premium. In the past core memories have comprised the main memory, but cores are now being displaced by semiconductor memories which are faster and more economical.

Speed in the semiconductor memory is limited by two constraints: circuit density and dynamic response of the semiconductor transistors. The latter constraint is determined primarily by the inherent capacitance of transistors and the requisite time in charging and discharging the transistors in reading and writing data. For example, in many semiconductor memories the transistor devices are driven into saturation in storing data, thus increasing the electrical charge of the inherent capacitance of the devices and consequently the time necesssary in changing transistor states.

SUMMARY OF THE INVENTION

An object of the present invention is an improved semiconductor memory.

Another object of the invention is a random access semiconductor memory with improved access time.

Yet another object of the invention is a random access memory requiring reduced power and which operates in a non-saturated mode without the use of diode clamps.

Still another object of the invention is a random access semiconductor memory employing current mode logic and which lends itself to integrated circuit techniques.

Features of the random access memory in accordance with the present invention include memory cells and isolation circuits employing current mode logic in reading and writing data. Each memory cell comprises a bistable flip-flop employing plural emitter bipolar transistors with addressing lines and input/output lines connected to selected transistor emitters.

The isolation circuit also functions as a sense amplifier during a read cycle and effects the writing of a data bit into a selected memory cell during a write cycle. In the isolation circuit a first bipolar transistor provides a current path in parallel with a memory cell transistor. Depending on the state of the memory cell transistor, current through the first bipolar transistor may vary, thereby affecting the base bias of the second bipolar transistor from which the output signal is taken.

Importantly, the voltage excursion in the memory cells may vary by as little as one-fourth volt between states.

The invention and the objects and features thereof will be more fully understood from the following detailed description and appended claims when taken with the drawing.

Description of Illustrative Embodiments

A random access memory (RAM) conventionally has the capability of writing, storing, and reading digital data typically arranged in a plurality of words. The RAM may comprise a plurality of memory arrays with each bit of a word stored in a separate array. In addressing the RAM the specific cells in each array which store the bits of a data word may be selectively addressed and read out through isolation circuits and an output buffer, or alternatively, a data word to be stored is provided through isolation circuits to the selectively addressed memory cells which have been prepared to receive data for storage.

Figure 1:
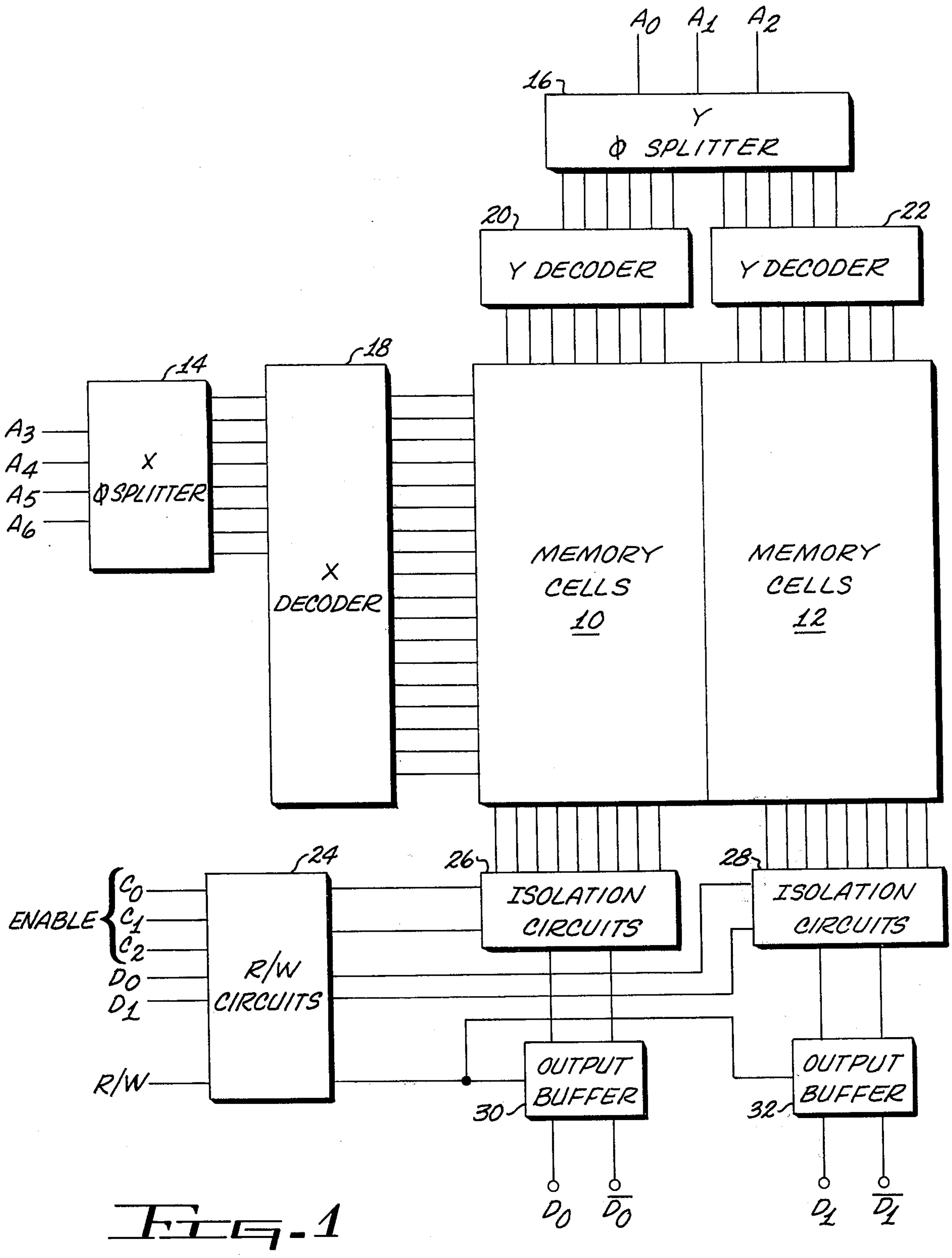
FIG. 1 is a functional block diagram of a random access memory (RAM) embodying the present invention.

FIG. 1 is a functional block diagram of a RAM employing memory arrays which may be addressed two at a time and which employs the present invention. Memory cells 10 and 12 may each comprise 16 rows of memory cells arranged in eight columns to store 128 data bits. Each of the 128 cells has a unique address for read/write operations. Seven address lines $A_0$–$A_6$ provide inputs through phase splitters 14 and 16 to X(row) decoder 18 and Y(column) decoders 20 and 22. Thus, a particular memory cell defined by row and column number is established by the codes of address lines $A_0$–$O_6$which decoders 18, 20, and 22 recognize to address a particular memory cell.

To control either a read or write operation, a read/-write circuit 24 is provided to control the operation of isolation circuits 26 and 28, through which the stored data is accessed, and output buffers 30 and 32, through which data is read. Read/write circuit 24 receives enabling signals $C_0$–$C_2$ which permit the enablement of selective memory arrays. In this illustrative embodiment the two memory cells 10 and 12 may be accessed simultaneously, and two data input lines $D_0$ and $D_1$ are provided for inputting data to the two memory cells, respectively, through read/write circuit 24. Additionally, a read/write control line (R/W) is provided to circuit 24 which controls either a read or a write operation.

Figure 2:
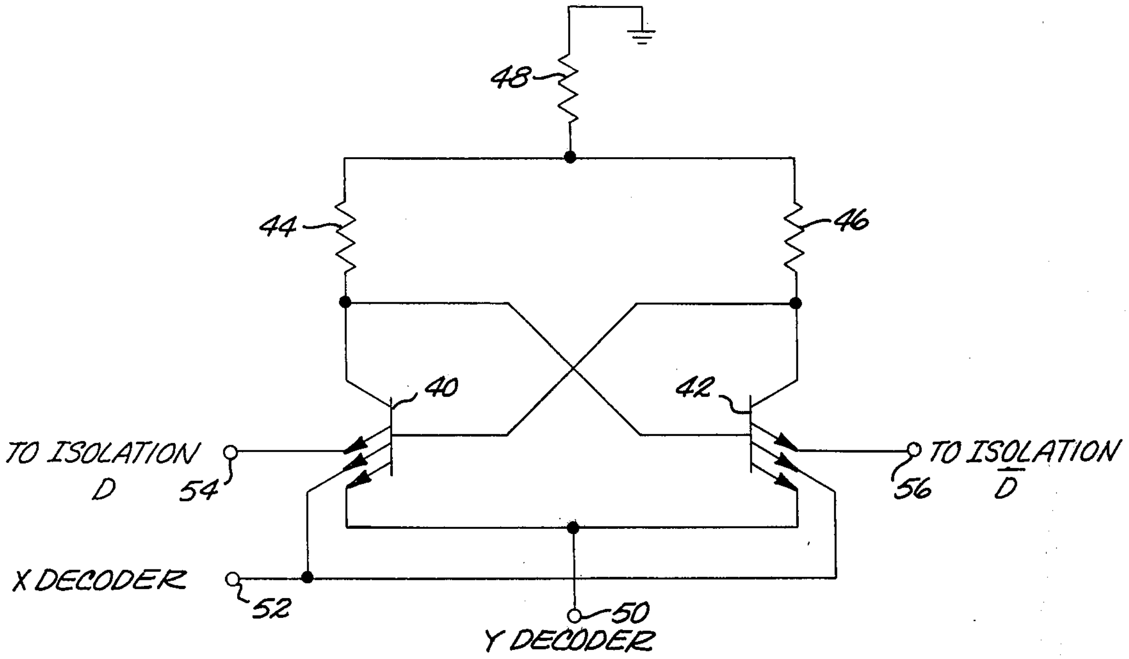
FIG. 2 is a schematic diagram of a RAM memory cell in accordance with the present invention.

Referring now to FIG. 2, a memory cell as employed in the RAM in accordance with the present invention is illustrated schematically. The memory cell comprises two plural emitter bipolar transistors 40 and 42 which are interconnected as a bistable flip-flop with the collector of transistor 40 connected to the base of transistor 42 and the collector of transistor 42 connected to the base of transistor 40. As is well known in the art, such an interconnection permits one of the two transistors to be conducting a higher level than the other transistor thereby storing a "1" and a "0" in the two transistors. In these illustrative embodiments N-P-N transistors are utilized and the "up" or 1 voltage is 0 volt while the "down" or 0 voltage is −1.0 volt. Resistors 44 and 46 respectively connect transistors 40 and 42 through common resistor 48 to a voltage potential terminal (e.g. ground). One emitter of each transistor 40 and 42 is connected in parallel to a Y decoder terminal 50, and one emitter of each transistor 40 and 42 is connected in parallel to an X decoder terminal 52. Two emitters of each transistor are required for bit or cell addressing; however, for word addressing only one emitter of each transistor is required for addressing. A third emitter of transistor 40 is connected to an isolation terminal 54(D), and a third emitter of transistor 42 is connected to isolation terminal 56($\overline{D}$).

With a plural emitter transistor of the N-P-N type shown, the most negative emitter governs operation of the transistor. In this illustrative embodiment the address lines to a selected memory cell go to −0.8 volt for addressing and a bit 1 is read at the isolation terminal as a −1.05 volt, and a bit 0 is read as a −1.3 volt. Thus, when reading the memory cell of FIG. 2 terminals 54 and 56 will register −0.25 volt and −0.5 volt depending upon the state of the flip-flop circuit. In a write operation a 1 bit is written into the cell by reducing the conductivity of one of the transistors 40 or 42. This is accomplished by applying a higher voltage (e.g. −0.8V) to the isolation terminal of the transistor to be driven towards cut-off, and applying a lower voltage (e.g. −1.05V) to the isolation terminal of the transistor to be driven on, thus recording either the presence of D or $\overline{D}$.

Figure 3:
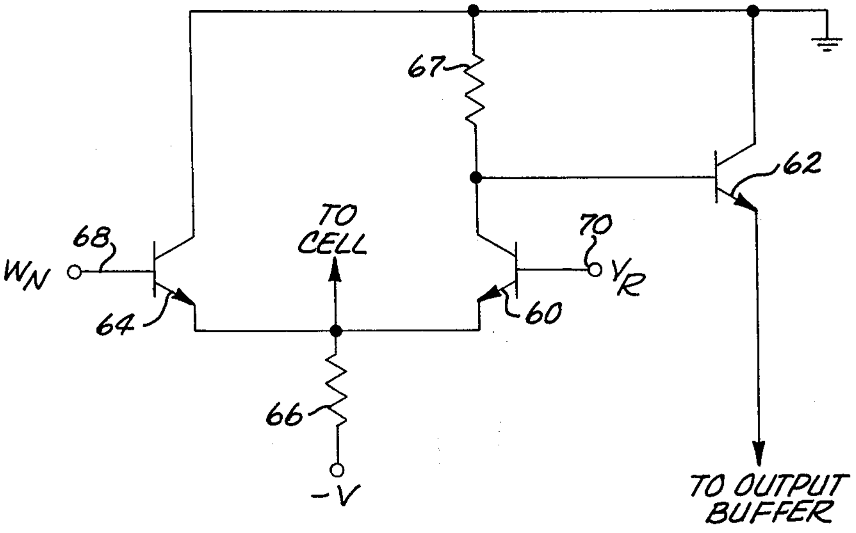
FIG. 3 is a schematic diagram of an isolation network in accordance with the present invention.

Reading and writing of the memory cell is effected through the isolation network shown schematically in FIG. 3. Each transistor of a memory cell is connected through an isolation network in which a first bipolar transistor 60 provides a current path in parallel with a memory cell transistor. Depending on the conductive state of the memory cell transistor, current through transistor 60 may vary thereby affecting the base bias on the second bipolar transistor 62 from which the output signal is taken.

A third bipolar transistor 64 is provided to effect the writing of data bits into the memory cell. The collector of transistor 64 is connected to the ground voltage potential and the emitter is connected to the emitter of transistor 60 and to the memory cell. A common resistor 66 connects the emitters of transistors 60 and 64 to a negative voltage source (−V). A write signal $W_n$ is applied to collector terminal 68 of transistor 64 and a reference voltage potential $V_r$ is applied to the collector terminal 70 of transistor 60. To write a 1 into the transistor of a memory cell the voltage on terminal 68 is higher than the reference voltage $V_r$ on terminal 70 thereby applying a high voltage level (e.g. 0 volt) to the emitter of the driven memory cell transistor, thereby turning the transistor off. Consequently, the other transistor of the memory cell flip-flop will of necessity assume a conductive state corresponding to a 0 stored bit.

During a read cycle transistor 64 is off and if the base voltage of the memory cell transistor is lower than the reference voltage $V_r$ on the collector of transistor 60, transistor 62 and consequently the lower conduction of transistor 62 reduces the output current through transistor 62. Conversely, if the memory cell transistor has an up level 1 bit stored therein, the current through resistor 66 will be shared by transistor 60 and the memory cell transistor. Therefore, the base bias on transistor 62 rises thereby rendering transistor 62 more conductive and the higher level current through transistor 62 effects a 1 output signal.

Figure 4:
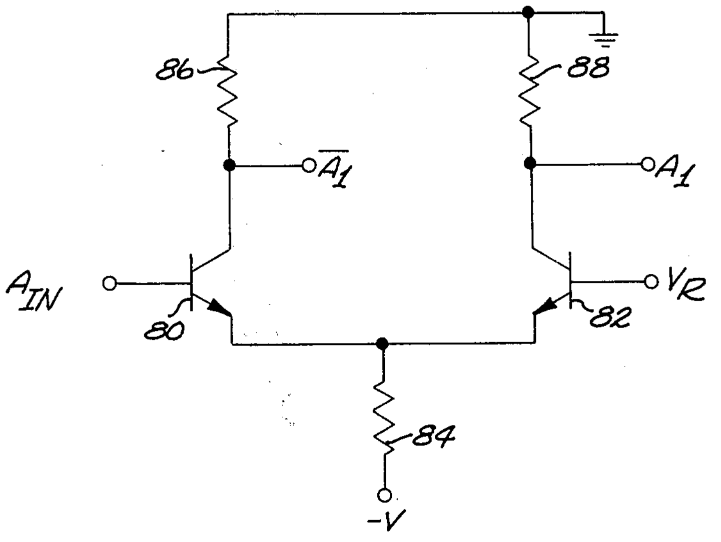
FIG. 4 is a schematic diagram of a phase splitter for use in the RAM of FIG. 1.

FIG. 4 is an electrical schematic of a phase splitter which may be utilized in the RAM of FIG. 1 to give a positive indication of either the real (A) or complement ($\overline{A}$) of an input signal $A_{in}$. Two N-P-N transistors 80 and 82 are connected with common emitters connected through resistor 84 to a negative voltage potential −V. Resistors 86 and 88 respectively connect the collectors of transistors 80 and 82 to ground potential. A reference voltage, $V_r$ (e.g. −0.26V) is applied to the collector of transistor 82 and the input signal $A_{in}$ is applied to the collector of transistor 80. When $A_{in}$ is a 0 (e.g. −1.0V) transistor 80 is cut off and a high voltage potential (0.0V) is present at the $\overline{A}$ output terminal taken at collector of transistor 80. Transistor 82 is conductive and output A taken at the collector of transistor 82 registers a 0 or e.g. −0.8V. Conversely, when Ain is a 1 (e.g. 0.0V), transistor 80 is conductive and the $\overline{A}$ output is at a 0 or −0.8V. Transistor 80 is rendered nonconductive by the rise in voltage potential on its emitter and the output A is a 1 (e.g. 0.0V potential). Thus, a positive indication of either A or $\overline{A}$ is obtained from the phase splitter of FIG. 4.

Figure 5:
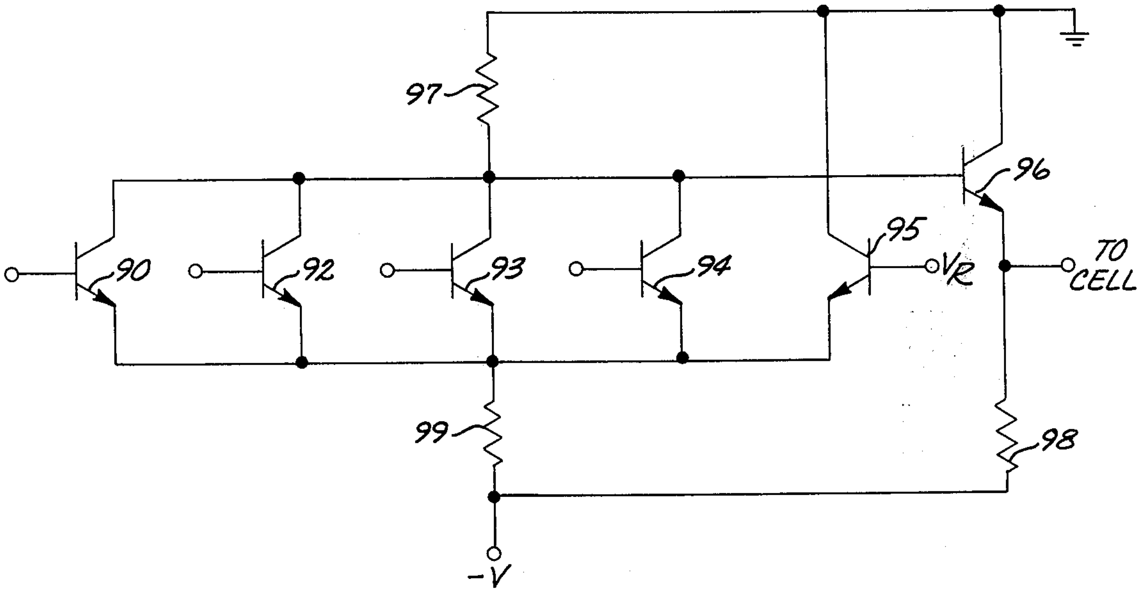
FIG. 5 is a schematic diagram of a decoder for use in the RAM of FIG. 1.

A decoder for use in the circuit of FIG. 1 is illustrated schematically in FIG. 5 wherein transistor 90–94 are connected in parallel and function as a NOR-gate. By connecting the complement of the address code for a particular memory cell to the inputs of transistors 90–94, transistor 96 is rendered conductive and the output of the emitter follower circuit defined by transistor 96 and resistor 98 is positive (e.g. 0V). If any one input to the collectors of transistors 90–94 is a 1 transistor 96 is rendered nonconductive and the output is a 0. Transistor 99 with a reference voltage $V_r$ (e.g. −0.26V) is connected between ground and the emitters of transistors 90–94 to insure that all transistors are rendered nonconductive in the absence of a 1 input thereto. Thus, transistor 96 is biased to conduct and provide a 1 output so long as each of transistors 90–94 is nonconductive.

Figure 6:
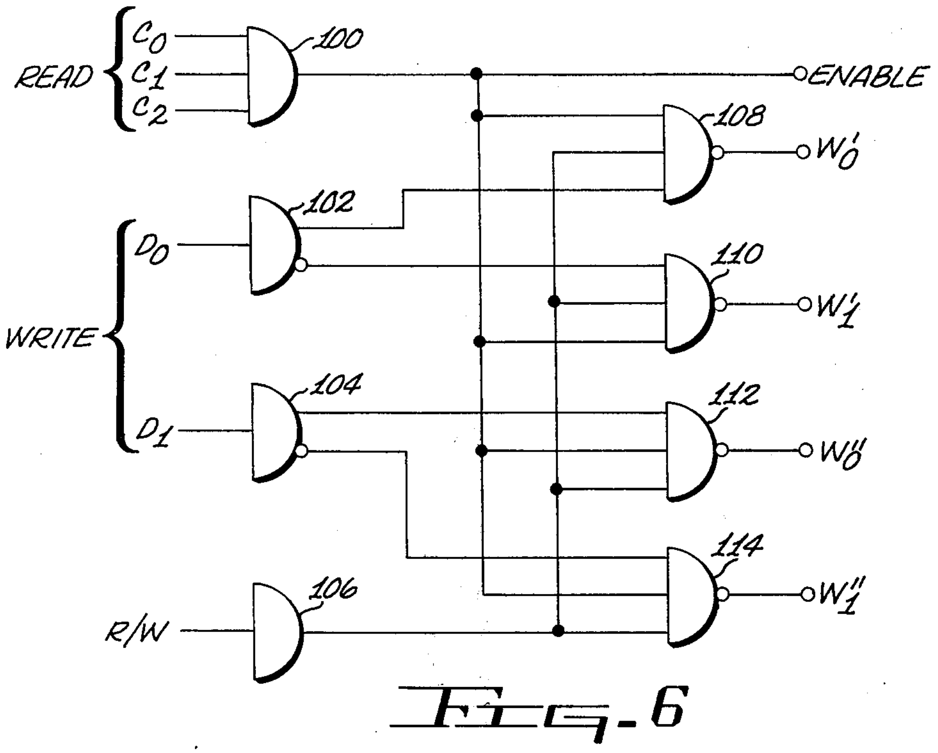
FIG. 6 is a functional diagram of read/write logic circuitry for use in the RAM of FIG. 1.

FIG. 6 is a logic diagram for the read/write circuitry for use in the RAM of FIG. 1. The particular array to be addressed for a read operation is selected by gate 100 (in this embodiment an OR-gate) to which code inputs $C_0$, $C_1$, and $C_2$ are applied. For a write operation data for memory cell 10 is applied through line $D_0$ to gate 102, and data for memory cell 12 is applied through gate 104. A read/write instruction is applied to gate 106. The outputs of gates 100, 102, 104 and 106 are interconnected as shown with NOR-gates 108, 110, 112, and 114 to provide a write zero ($W_0'$) or a write one ($W_1'$) to memory cell 10 or a write zero ($W_0''$) or a write one ($W_1''$) to memory cell 12 in accordance with the following logic equations:

$$\text{Enable} = C_0 + C_1 + C_2$$
$$W_0' = \overline{R/W + (C_0 + C_1 + C_2) + D_0'} = \overline{R/W} \cdot \overline{C_0} \cdot \overline{C_1} \cdot \overline{C_2} \cdot \overline{D_0'}$$
$$W_1' = \overline{R/W + (C_0 + C_1 + C_2) + \overline{D_0'}} - \overline{R/W} \cdot \overline{C_0} \cdot \overline{C_1} \cdot \overline{C_2} \cdot D_0'$$
$$W_0'' = \overline{R/W + (C_0 + C_1 + C_2) + D_1'} = \overline{R/W} \cdot \overline{C_0} \cdot \overline{C_1} \cdot \overline{C_2} \cdot \overline{D_1'}$$
$$W_1'' = \overline{R/W + (C_0 + C_1 + C_2) + \overline{D_1'}} = \overline{R/W} \cdot \overline{C_0} \cdot \overline{C_1} \cdot \overline{C_2} \cdot D_1'$$

In this embodiment a memory array is enabled when $C_0$, $C_1$, and $C_2$ are at the lower voltage level (−0.5V). When the chip is disabled, the true data output is forced to a down level (−0.5V). When the chip is enabled and the read/write instruction is at the up level, the data is read out from the selective memory cell. If the read/write input is at the down level, the data is written into the selected memory cell.

Figure 7:
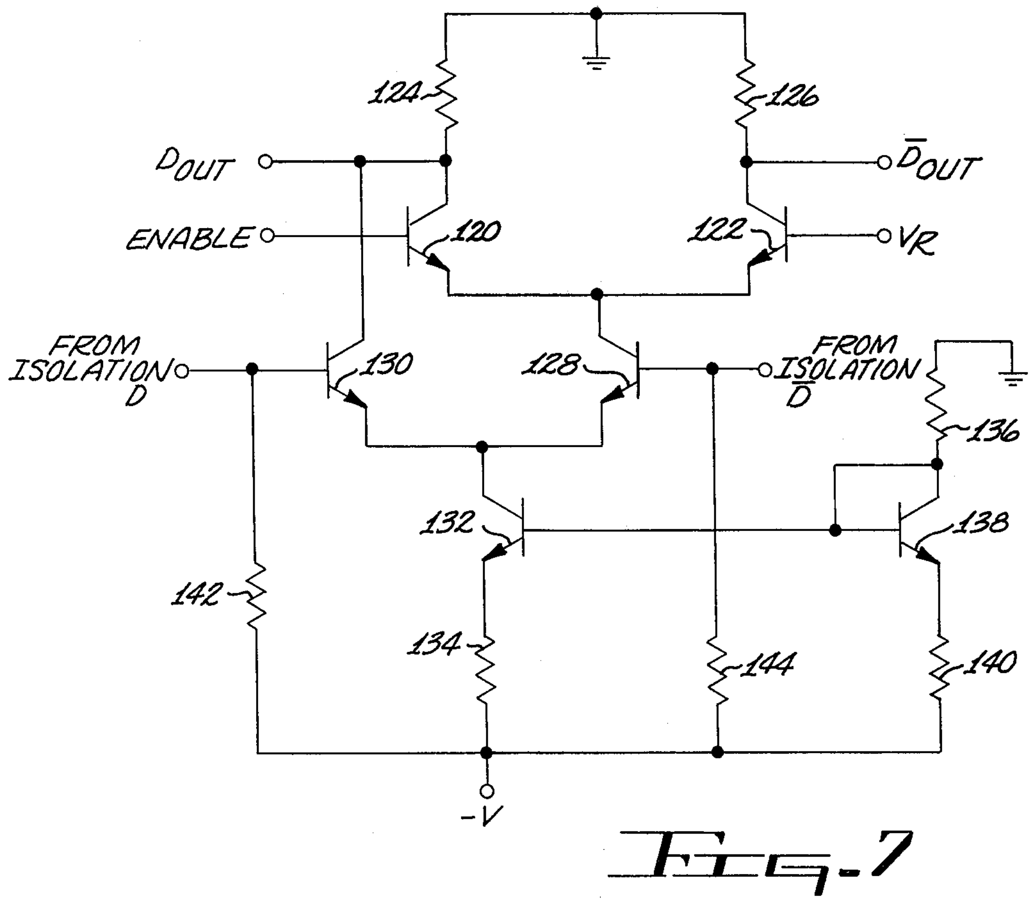
FIG. 7 is an electrical schematic of an output buffer for use in the RAM of FIG. 1.

FIG. 7 is a schematic of an output buffer which may be employed in the illustrative embodiment of the RAM of FIG. 1. The D-out and $\overline{D}$-out from the buffer are taken respectively at the collectors of transistors 120 and 122. A reference voltage $V_r$ (e.g. –0.25V) is applied to the base of transistor 122 and the enable signal from the read/write logic circuitry of FIG. 6 is applied to the base of transistor 120. Resistors 124 and 126 connect the collectors of transistors 120 and 122 to ground potential, respectively.

The emitters of transistors 120 and 122 are connected to the collector of transistor 128 with the base of transistor 128 connected through an isolation circuit to the $\overline{D}$ outputs of memory cells. The collector of transistor 130 is connected to the collector of transistor 122 and the D-out terminal with the base of transistor 130 connected through isolation circuits to the D outputs of memory cells.

A negative voltage potential is provided to the common emitters of transistors 128 and 130 by transistor 132 which is serially connected through resistor 134 to a minus voltage potential, –V. A conductive bias potential is provided to the base of transistor 132 by the serial circuit comprising resistor 136, transistor 138, and resistor 140, which maintain a constant current through transistor 132. Resistors 142 and 144 connect the bases of transistors 130 and 128, respectively, to the minus voltage potential, –V.

In the disabled state, the enable input to the base of transistor 120 is at the up level (0.0V) rendering transistor 120 conductive and D-out is locked to a low or negative voltage level. Transistor 122 becomes less conductive and the $\overline{D}$-out is at the higher or ground voltage level indicating no output from the buffer circuit. When the memory array is enabled the enable input to the base of transistor 120 is at the down level, therefore transistor 120 is rendered nonconductive and transistor 122 becomes more conductive.

With transistor 120 rendered nonconductive by an enable input signal, the $D_{out}$ terminal is activated and responsive to inputs from the isolation circuit. If the true or D output from a memory cell is present, transistor 130 is rendered conductive and current flows through transistor 130 to the D-out terminal. Conversely, if the complement or $\overline{D}$ output from the isolation circuits is present then transistor 128 is rendered conductive and current flows through transistor 128 and transistor 122 to the $\overline{D}$ output terminal. Thus, current flows through the $D_{out}$ terminal if an enable signal is applied to transistor 120 and the true or D output signal is present from the isolation circuitry. If transistor 120 is enabled but the $\overline{D}$ output signal is received from an isolation circuit, then no current flows through D-out but current flows through transistors 128 and 122 to the $\overline{D}$ output.

In one embodiment the following voltage and resistor values were used:

| | |
|---|---|
| 44 – 1.5K ohms | 99 – 2.06K |
| 46 – 1.5K | 124 – 56 |
| 48 – 1.5K | 126 – 56 |
| 66 – 6.5K | 134 – 51 |
| 67 – 1.7K | 136 – 408 |
| 84 – 770 | 140 – 102 |
| 86 – 152 | 142 – 670 |
| 88 – 168 | 144 – 670 |
| 97 – 430 | |
| 98 – 600 | $V_r$ = –0.26V |
| | –V = –3.3V |

A random access memory utilizing the memory cells and isolation circuitry in accordance with the present invention has improved speed because of the limited voltage excursions of the memory cell in changing states and in the limited voltage excursions in implementing read or write operations. While the invention has been described with reference to illustrative embodiments, the description is for illustration purposes and is not to be construed as limiting the scope of the invention. Various modifications and changes may occur to those skilled in the art without departing from the true spirit and scope of the invention as defined by the appended claims.

I claim:

1. A random access memory comprising:

A. a plurality of memory cells arranged in rows and columns and selectively addressable for read or write operations, each cell comprising a pair of plural emitter bipolar transistors with conductive means connecting the base of each transistor to the collector of the other transistor, resistive means connecting the collector of each transistor to a voltage potential, first addressing means connected to a first emitter of each of said pair of transistors, a first output connected to a second emitter of one transistor, and a second output connected to a second emitter of the other transistor;

B. address decoding means for selectively addressing said plurality of memory cells;

C. output circuit means including a plurality of isolation circuits each connected to one output of each cell in each column of memory cells, said isolation circuit comprising first and second bipolar transistors with conductive means interconnecting the emitters of said first and second transistors, resistive means connecting said conductive means to a first voltage potential, means connecting said conductive means to said memory cell outputs, a write control line connected to the base of said first transistor, a reference voltage potential connected to the base of said second transistor, means connecting the collectors of said first and second transistors to a second voltage potential, and a third bipolar transistor, means connecting the collector of said second transistors to the base of said third transistor, means connecting the collector of said third transistor to said second voltage potential, and memory output means connected to the emitter of said third transistor; and D. read/write control means for controlling said output circuit means for respective read and write operations.

2. A random access memory as defined by claim 1 wherein each memory cell includes second addressing means connected to third emitters of said first and second transistors.

3. A random access memory as defined by claim 2 wherein said output memory means further includes an output buffer circuit with means for selectively enabling said buffer circuit in response to said read/write control means.

4. A random access memory as defined by claim 3 wherein said output buffer circuit includes a constant current source, a first transistor switch operable in response to a stored 1 as transmitted through an isolation circuit to provide a real data output from said constant current source, a second transistor switch operable in response to a stored 0 as transmitted through an isolation circuit to provide a complement data output from said constant current source, and enabling means for enabling data readout in response to a read control signal.

5. A random access memory as defined by claim 3 wherein said read/write control means comprises gate means interconnected and responsive to an enable signal, a data-in signal, and a read or write signal to effect the reading of a memory cell or the writing of a data bit into a memory cell.

6. A random access memory as defined by claim 5 wherein said addressing decoding means comprises a first plurality of transistors having emitter and collector terminals connected in parallel, a first transistor with emitter connected to the emitters of said first plurality of transistors and collector connected to a first voltage potential, resistive means connecting said first voltage potential to said collectors of said first plurality of transistors, resistive means connecting the emitters of said first plurality of transistors and said first transistor to a second voltage potential, a second bipolar transistor, conductive means connecting the collector of said second transistor to said first voltage potential, resistive means connecting the emitter of said second transistor to said second voltage potential, conductive means connecting the base of said second transistor to the collectors of said first plurality of transistors, and output means connected to the collector of said second transistor.

7. For use in a random access memory, a memory cell comprising a plurality of memory cells arranged in rows and columns and selectively addressable for read or write operations, each cell comprising a pair of plural emitter bipolar transistors with conductive means connecting the base of each transistor to the collector of the other transistor, resistive means connecting the collector of each transistor to a voltage potential, first addressing means connected to a first emitter of each of said pair of transistors, a first output connected to a second emitter of one transistor, and a second output connected to a second emitter of the other transistor, and output circuit means including a plurality of isolation circuits each connected to one output of each cell in each column of memory cells, said isolation circuit comprising first and second bipolar transistors with conductive means interconnecting the emitters of said first and second transistors, resistive means connecting said conductive means to a first voltage potential, means connecting said conductive means to said memory cell outputs, a write control line connected to the base of said first transistor, a reference voltage potential connected to the base of said second transistor, means connecting the collectors of said first and second transistors to a second voltage potential, and a third bipolar transistor, means connecting the collector of said second transistor to the base of said third transistor, means connecting the collector of said third transistor to said second voltage potential, and memory output means connected to the emitter of said third transistor.

* * * * *